United States Patent [19]
Crowe et al.

[11] Patent Number: 5,970,488
[45] Date of Patent: Oct. 19, 1999

[54] REAL-TIME DISTRIBUTED DATABASE SYSTEM AND METHOD

[75] Inventors: Douglas G. Crowe, Parkton; Gary K. LaBarre, Lineboro; James E. Somers, Jr., Annapolis; Timothy P. Magnani, Fulton, all of Md.

[73] Assignee: Northrop Grumman Corporation, Los Angeles, Calif.

[21] Appl. No.: 08/851,071

[22] Filed: May 5, 1997

[51] Int. Cl.⁶ .................................................. G06F 17/30
[52] U.S. Cl. ................................ 707/8; 707/10; 707/201
[58] Field of Search ................... 707/10, 8, 201

[56] References Cited

U.S. PATENT DOCUMENTS

| | | | |
|---|---|---|---|
| 4,648,036 | 3/1987 | Gallant | 707/203 |
| 4,821,175 | 4/1989 | Hikita et al. | 707/8 |
| 5,412,801 | 5/1995 | Remer et al. | 395/182.18 |
| 5,564,019 | 10/1996 | Beausoleil et al. | 395/200.45 |
| 5,581,749 | 12/1996 | Hossain et al. | 707/10 |
| 5,586,310 | 12/1996 | Sharman | 707/10 |
| 5,781,908 | 7/1998 | Williams et al. | 707/104 |
| 5,781,910 | 7/1998 | Gostanian et al. | 707/201 |
| 5,806,075 | 9/1998 | Jain et al. | 707/201 |

Primary Examiner—Jack M. Choules
Attorney, Agent, or Firm—Walter G. Sutcliff

[57] ABSTRACT

A distributed database system includes a plurality of nodes connected via a network medium. Each node runs at least one application and stores a database. Each database at least partially overlaps at least one other database. Each database includes a plurality of tables, and each table includes at least one record. Ownership of each table in the database is assigned to only one application, and only an owning application can modify a table owned by the owning application. Each node also schedules running of the applications on the node such that only one application reads from and writes to the database at a time, distributes updates made to the database to every other database, and updates the database in accordance with received distributed updates.

45 Claims, 4 Drawing Sheets

REAL-TIME DISTRIBUTED DATABASE SYSTEM AND METHOD

BACKGROUND OF THE INVENTION

1. Field of Invention

The present invention relates to a real-time distributed database system and method.

2. Description of Related Art

Distributing computer applications across multiple processors (nodes) has been an important requirement in systems development for some time. Each of the distributed applications have a need to share data in order to perform their allocated functions. For small systems this has been accomplished by sending all data in discrete application messages, but when a large amount of data is required, a database solution is necessary. The typical solution is to maintain a single database on one node, and have all other remote applications query that node when they need data from the database. While one node is accessing the data, the other nodes are locked out to maintain data integrity.

This "client-server" paradigm works well for non-real-time applications where the volume of data accessed is low and the frequency of those accesses is also low. The client-server paradigm, however, cannot support the high speed access and high data rates generally required by real-time applications. This is caused by the delays associated with the network access and the "wait" time associated with locking mechanisms to prevent more than one access at a time. In addition, as the number of client nodes grows large, the bandwidth of the network becomes a limiting factor due to the large number of duplicated data requests and the associated data transfers as each client requests and receives data.

Some commercial database vendors have developed a replication feature that allows a database to be mirrored on another node for fail safe purposes. This "copy" is for backup purposes only, and the copies associated with the mirroring function further degrade effective network bandwidth. In addition, this backup scheme requires a dedicated backup node strictly for the database.

Other conventional solutions provide for local copies of the data to improve access times, but these schemes require a master database and a backup database and periodically check consistency of the remote copies against the master. This consistency checking can steal a significant amount of time for checking and repair. These solutions also fail to ensure that the database updates are received by the remote nodes in the correct sequence.

Conventional systems that use a master database have a data maintenance problem. When one processor updates a portion of the common data, all other nodes are prevented from accessing that data until the update is complete. This is usually implemented using a series of locks. When an application needs to update a portion of common data, it first performs a series of network transactions to acquire a lock on the data to be updated. Locked data cannot be updated by other applications and in some systems can not be read by other applications until the locks are removed. When an application successfully acquires a lock, it updates the information in the database (first in a local copy if a local copy of the database is maintained, and then in the master database). Network operations are performed that update the data in all other copies of the database. When all updates are complete the holder of the lock releases the lock and other applications may again access the modified data.

There are several serious problems associated with the conventional solutions to this problem. First the update process is extremely slow and is therefore not applicable for real-time and near-real-time systems. In addition, duplication of data significantly cuts into available network bandwidth. Another problem associated with the locking mechanisms is that when processors fail they run the risk of leaving data inaccessible by not releasing the locks. Conventional systems correct this problem by implementing complicated, time-consuming, cleanup processing to make the database usable to the remaining processors after a processor failure. Once again this is not an acceptable situation for real-time and near-real-time systems. Finally, the maintenance of a master copy of the data reduces overall system reliability since the system is dependent on the two machines maintaining the master and backup databases.

SUMMARY OF THE INVENTION

This invention provides for data integrity and high performance across multiple processors by maintaining a copy of the database on each machine using a reliable broadcast mechanism. This eliminates the need for network level data locking and request/transmission traffic. Each piece of data is broadcast on the network once (in the event of a transmission error the data will be broadcast again). In this invention there is no master and no specified backup database. All nodes serve as backup and each acts as it's own master increasing system reliability and reducing cost.

To accomplish this, the invention system imposes the following three rules on its users. The first rule is that every data component (e.g., table or record) in the system must, at any given point in time, have at most one writer. Writership may be on a table basis (series of records) or on an individual record basis. This rule eliminates the need for time consuming network level lock operations and ensures that data is not overwritten.

The second rule is that for each copy of the database, only one application may read or write the data components at any point in time. This rule prevents contention for data on single machines and eliminates the need for local locks. This allows each application to treat the database as a consistent, stable entity while it has access. This rule could be eliminated by placing local locks on the data records which are much less time consuming than network level locks.

The third rule is that the applications initiate the distribution of the updates to other processors and the acceptance of updates from the other processors. This ensures the integrity of the database during the applications execution period and ensures that the updates will be transferred at times when they are complete and consistent with each other.

As stated, this invention maintains a copy of the database on every machine. Applications update this local copy on a record by record basis. When records are updated this invention sets a flag stored with that record that indicates that the data has changed. When it is time to transmit changes to other databases, this invention scans through all of the update flags in the database and sends only the changed records to other processors. In an alternate embodiment, when it is time to transmit changes to other databases, this invention scans through a set of lists identifying updated records in the database and sends only the changed records to other processors.

For a distributed application, each machine's database structure will be the same (e.g., the same tables with their associated record structures). However, the invention system does not require that databases on the participating machines be identical. Multiple distributed applications can be executed which share some, all, or none of their respective distributed databases with each other. This feature can, for example, be used to implement a central facility to control and monitor multiple distributed applications. The control and monitor data portions of the database can be common across each distributed application's database, and the application specific portions of the database can be unique to their respective distributed applications.

This invention has been implemented using a reliable network communications system to distribute updates between multiple processors. The reliable broadcast system queues messages received, detects missing messages and provides for retransmission of missing messages. The reliable broadcast system provides the messages to the distributed database invention when complete and requested by the distributed database invention. The rules implemented by this invention, together with the reliable nature of the message transfer protocol ensure that the database remains consistent with itself and consistent between nodes.

One objective of the present invention is to provide a system and method implementing a distributed database with local copies of the database on every node.

Another objective of the present invention is to provide a system and method implementing a distributed database having data consistency without relying on a single master database.

A further objective of the present invention is to provide a system and method implementing a distributed database having high system reliability without a designated backup database.

A still further objective of the present invention is to provide a system and method implementing a distributed database which greatly improves usable network bandwidth due to the elimination of network level locking mechanisms and data request messages.

Another objective of the present invention is to provide a system and method implementing a distributed database which, under normal conditions, broadcasts each database update on the network only once.

An additional objective of the present invention is to provide a system and method implementing a real-time distributed database.

A further objective of the present invention is to provide a system and method implementing multiple distributed databases which can partially, fully or trivially overlap.

The objects of the present invention are achieved by providing a method of forming a distributed database, comprising: (a) providing a plurality of nodes connected via a network medium; (b) providing at least one application on each node; (c) creating a database on each node, each database at least partially overlapping at least one other database, each database including a plurality of tables, and each table including at least one record, said step (c) including the substep of (c1) assigning ownership of each table in each database to only one application; (d) allowing only an owning application to modify a table owned by said owning application; (e) allowing only one application to one of read from and write to a database at a time; (f) distributing updates made to each database to every other database; and (g) updating each database in accordance with said distributed updates.

The objects of the present invention are further achieved by providing a method for generating a data update message corresponding to a database stored at a node in a distributed database system, which includes a plurality of nodes each storing a database, to distribute updates to each database, each database overlapping at least partially with a database stored on one other node, each database containing a plurality of tables, each table having a table update flag associated therewith and containing at least one record, each record having a record update flag associated therewith, said table update flag and said record update flag indicating that a corresponding table and record, respectively, have been modified when set, the method comprising: (a) locating a modified table in said database based on said table update flags; (b) locating a modified record in said modified table based on said record update flags; (c) writing a header in said data update message, said header including a table identifier and record number, said table identifier identifying said modified table, said record number identifying said modified record in said modified table; (d) writing contents of said modified record in said data update message; and (e) sending said data update message to each node via a communication medium connecting said nodes.

The objects of the present invention are still further achieved by providing a method for generating a data update message corresponding to a database stored at a node in a distributed database system, which includes a plurality of nodes each storing a database, to distribute updates to each database, each database overlapping at least partially with a database stored on one other node, each database containing a plurality of tables, each table having a table identifier associated therewith and containing at least one record, each record having a record number associated therewith, said database at each node having an updated table list associated therewith, said updated table list storing said table identifier for each modified table in said database, each table having an updated record list associated therewith, said updated record list storing said record number for each modified record in an associated table, the method comprising: (a) locating a modified table in said database based on said updated table list; (b) locating a modified record in said modified table based on said updated record list associated with said modified table; (c) writing a header in said data update message, said header including said table identifier for said modified table and said record number for said modified record; (d) writing contents of said modified record in said data update message; and (e) sending said data update message to each node via a communication medium connecting said nodes.

The objects of the present invention are also achieved by providing a method of updating a database stored at a node in a distributed database system, which includes a plurality of nodes each storing a database and connected via a communication medium, each database overlapping at least partially with a database stored on one other node, each database containing a plurality of tables, each table containing at least one record, the method comprising: (a) receiving, at a node, a data update message on said communication medium, said data update message including at least one header associated with a record and contents of said record, said header including a table identifier identifying a table containing said record and a record number associated with said record; (b) extracting said header from said data update message; (c) locating said record in said database stored at said node based on said table identifier and said record number in said extracted header; and (d) writing said contents of said record in said data update message into said record of said database located in step (c).

The objects of the present invention are additionally achieved by providing a distributed database system, comprising: a plurality of nodes connected via a communication medium; and wherein each node includes, at least one application; a database stored on said node, said database at least partially overlapping at least one other database, said database including a plurality of tables, and each table including at least one record, ownership of each table in said database being assigned to only one application, and only an owning application being able to modify a table owned by said owning application; scheduling means for scheduling running of said applications on said node such that only one application reads from and writes to said database at a time; distributing means for distributing updates made to said database to every other database; and updating means for updating said database in accordance with received distributed updates.

The objects of the present invention are further achieved by providing a distributed database system, comprising: a plurality of nodes connected via a communication medium, each node storing a database, each database overlapping at least partially with a database stored on one other node, each database containing a plurality of tables, each table having a table update flag associated therewith and containing at least one record, each record having a record update flag associated therewith, said table update flag and said record update flag indicating that a corresponding table and record, respectively, have been modified when set; and wherein each node locates a modified table in said database based on said table update flags, locates a modified record in said modified table based on said record update flags, first writes a header in a data update message, said header including a table identifier and record number, said table identifier identifying said modified table, said record number identifying said modified record in said modified table, second writes contents of said modified record in said data update message, and sends said data update message to each node via said communication medium.

The objects of the present invention are also achieved by providing a distributed database system, comprising: a plurality of nodes connected via a communication medium, each node storing a database, each database overlapping at least partially with a database stored on one other node, each database containing a plurality of tables, each table having a table identifier associated therewith and containing at least one record, each record having a record number associated therewith, said database at each node having an updated table list associated therewith, said updated table list storing said table identifier for each modified table in said database, each table having an updated record list associated therewith, said updated record list storing said record number for each modified record in an associated table; and wherein each node first locates a modified table in said database based on said updated table list, second locates a modified record in said modified table based on said updated record list associated with said modified table, first writes a header in a data update message, said header including said table identifier for said modified table and said record number for said modified record, second writes contents of said modified record in said data update message, and sends said data update message to each node via said communication medium.

The objects of the present invention are still further achieved by providing a distributed database system, comprising: a plurality of nodes each storing a database and connected via a communication medium, each database overlapping at least partially with a database stored on one other node, each database containing a plurality of tables, each table containing at least one record; at least one node receiving a data update message on said communication medium, said data update message including at least one header associated with a record and contents of said record, said header including a table identifier identifying a table containing said record and a record number associated with said record; and said node extracting said header from said data update message, locating said record in said database stored at said node based on said table identifier and said record number in said extracted header, and writing said contents of said record in said data update message into said located record of said database.

The objects of the present invention are additionally achieved by providing a method of communication between applications in a distributed database system which includes a plurality of nodes connected via a network medium, each node running at least one application and storing a database, each database at least partially overlapping at least one other database, each database including a plurality of tables, and each table including at least one record and being owned by only one application, the method comprising: (a) sending modification requests from non-owning applications to an owning application via said communication medium, said modification requests indicating a desired modification to a record in a table not owned by said non-owning application and owned by said owning application; (b) receiving, by said owning application, modification requests which request modification of a record in a table owned by said owning application; and (c) modifying tables owned by said owning application in accordance with modifications generated by said owning application and modifications in said received modification requests.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
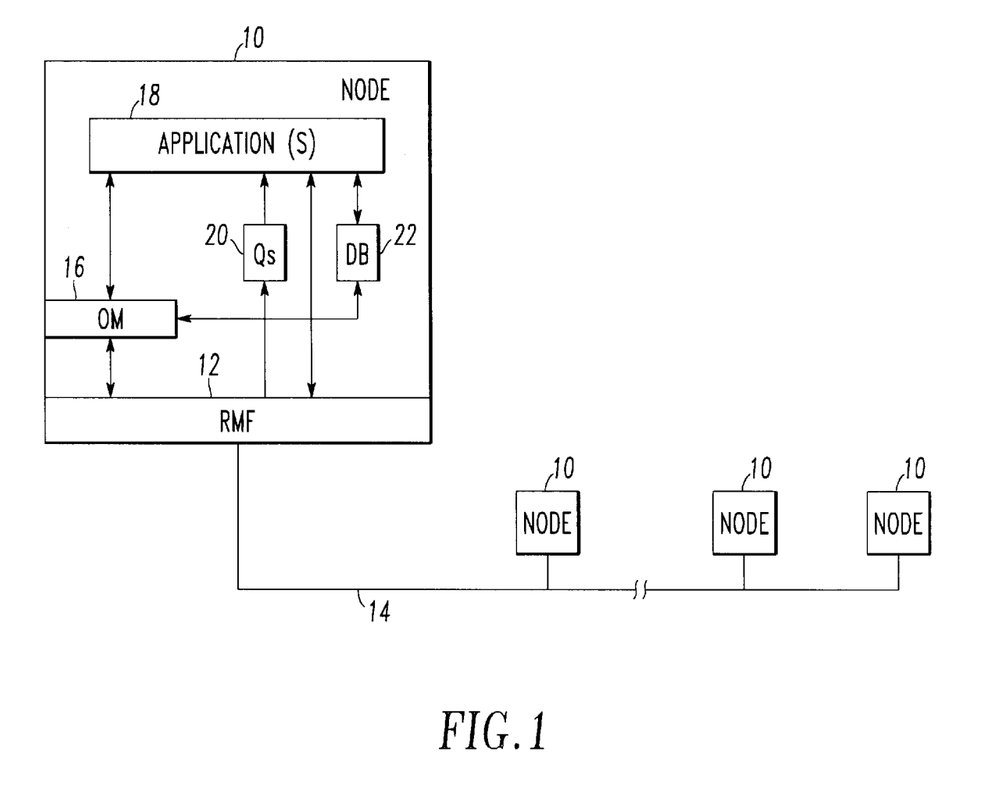
FIG. 1 illustrates a computer network according to the present invention.

FIG. 1 illustrates a computer network according to the present invention. As shown in FIG. 1, a plurality of computers 10, referred to as nodes, are connected to a communication medium 14. As further shown, each node 10 runs Reliable Messaging Facility (RMF) software 12 to implement the method of reliable broadcast and multicast of messages on the communication medium 14 according to U.S. application Ser. No. unknown, entitled Reliable Computer Network Broadcast System and Method, filed by inventors Gary K. LaBarre, Douglas G. Crowe, Frank M. Thomas, Jeff W. LaRue, and the subject matter of which is hereby incorporated by reference. Alternatively, other network transport capable of reliably delivering messages to multiple processors, such as TCP/IP (Transmission Control Protocol/Internet Protocol) and OSI (Open Systems Interconnect), could be used. Each node 10 also runs the Object Manager (OM) software 16 to implement the real-time distributed database system and method according to the present invention.

Each node 10 includes the RMF software 12 and the OM software 16 in communication therewith. Furthermore, each node 10 includes the database 22 set-up by the OM software 16 in accordance with definitions supplied by one or more applications 18. As shown in FIG. 1, the applications 18 communicate with the OM software 16, the RMF software 12, the database 22, and optionally, modification request queues 20. As will be understood from the discussion below, whether a node 10 includes one or more modification request queues 20 depends on the tables in the database 22 owned by the applications 18 running on that node 10.

Any high speed computer (e.g., UNIX workstation, PC compatible, Apple Macintosh, etc.) may be used as the nodes 10. In a preferred embodiment, Digital Equipment Corporation's Alpha Server Computers Model 2100 running at 275 MHz were used. Of course, any DEC Alpha Server may also be used. Any communication medium that supports broadcast and/or multicast is suitable as the communication medium 14. For instance, ETHERNET may serve as the communication medium; however, a 100 Mbit fiber optic (FDDI) network is the preferred implementation. Furthermore, a digital radio transmission link or other communication medium would also be suitable. In a preferred embodiment, the RMF and OM software 12 and 16 were written in Ada for its high reliability and strong data typing, although, any other generally accepted computer language would work well. These other computer languages include, but are not limited to C, C++, Pascal, and Fortran.

The OM software 16 operates as an interface between applications 18 using the database 22 and the database 22. The applications 18 running on each node 10 are programmed to define the tables in the database 22. Defining tables in the database 22 may be accomplished in a static and/or a dynamic manner.

In the static manner, the programmer of the application 18 uses a generic (i.e., a block of code having both process and data abstraction) provided by the OM software 16 to instantiate the static tables in the database 22 by specifying the number of records in each table and the definition of each record. The programmer also assigns a unique table identifier to each table, and assigns a record number to each record in a table. When the applications 18 are run, the static tables in the database 22 elaborate using the programmed definition (instantiation) of tables to allocate memory for the records in the static tables. During elaboration of the static tables, the OM software 16 allocates memory to create an update flag associated with each table and record. When set, a table update flag indicates that the corresponding table contains a record which has been modified, while a record update flag indicates that the corresponding record has been modified. The applications 18 can be programmed such that the database 22 created at each node fully overlaps, partially overlaps, or only trivially overlaps the databases 22 created at the other nodes 10.

When defining a static table, the allocated memory is fixed at a predetermined size to contain the specified number of records. The definition of a static table is effective when the number of records that are required for a table is known before the applications 18 run. In certain situations, the actual number of records that are required for a table is unknown until the applications 18 begin running. Therefore, defining static tables may result in an inefficient allocation of memory. Defining tables dynamically in the database 22 eliminates these inefficiencies.

To define dynamic tables, the programmer of the applications 18 uses a generic provided by the OM software 16 to instantiate the dynamic tables in the database 22. This instantiation of the dynamic tables defines the number of records within each table and defines each record. The number of records specified by the programmer actually represents the maximum number of records that may be contained in each dynamic table. The programmer also assigns table identifiers to each dynamic table and assigns a record number to each record in a dynamic table.

When the applications 18 are run, each application 18 specifies the actual number of records contained in the dynamic tables owned by that application 18. For each dynamic table, the OM software 16 only allocates memory for the number of records specified by the owning application 18. The OM software 16 also allocates memory to create a table update flag and record update flag corresponding to each dynamic table and record, respectively. Then, the OM software 16 transmits the dynamic table definitions to the other nodes 10 in the system via the RMF software 12. The OM software 16 at each node 10 will define the dynamic tables not owned by the applications 18 running on their nodes in accordance with the received definitions. In this manner, the memory at each node 10 is more efficiently allocated for the database 22.

As alluded to above, each table in the database 22 is owned by a single application 18, and only that application can modify data in that table. Instead of basing ownership on a table basis, however, ownership can be on a record basis. This ownership rule prevents databases 22 on different nodes 10 from having different data for the same record; thereby, ensuring consistency between databases 22. Typically, only the owning application 18 will have cause to modify the owned table. The system, however, can be configured to allow applications 18 which do not own a particular table to modify that table. When an application 18 wants to modify an unowned table, that application 18 requests the owning application 18 to modify the table in the desired manner. The modification request along with the desired modification is transmitted to the owning application 18 over the network medium 14 using the RMF software 12. The owning application 18 then receives the modification request via the RMF software 12 at its node 10, and modifies the table identified in the request in the manner specified. In this manner an application 18 can modify a table which it does not own.

Specifically, each table which can be modified by other than the owning application 18 has a modification queue 20 associated therewith, and each one of these modification queues 20 has a unique service access point (SAP) associated therewith. The SAPs for the modification queues 20 at a particular node 10 are enabled only at that node 10. Using the SAPs, the RMF software 12 can indicate in the modification request which modification queue 20, and therefore which table, a modification request is destined. Furthermore, based on the SAPs enabled at a particular node 10, the RMF software 12 running at that node 10 can determine which modification requests are destined for modification queues 20 at that node 10, and route the modification requests to the appropriate modification queues 20.

It should be noted that a non-owning application 18 running at the same node 10 as the owning application 18 also outputs modification requests to the RMF software 12 for transmission on the network medium 14. Consequently, the owning application 18 does not distinguish between modification requests coming from the same or different nodes 10.

If an application 18, owning a table which can be modified by other applications 18, has modifications to make to that table, the owning application 18 directly instructs the OM software 16 to make the requested modifications. The owning application 18 then instructs the OM software 16 to modify the table based on modification requests in the associated modification queue 20. Therefore, consistency between the databases 22 is maintained while increasing the flexibility of the system.

The modification request communication system discussed above is but one possible method of communicating database modification requests, and it should be understood that any method of communicating modification requests between applications can be used.

Furthermore, only one application may read data from or write data to a database 22 at any point in time. This is accomplished by scheduling the running of each application 18 and the OM software 16. For instance in a preferred embodiment, a scheduling application 18 running at each node 10 sequentially runs each applications 18, and then runs the OM software 16. This order of operation is then repeated. Consequently, only one application 18 or the OM software 16 is running at one time on a node 10 such that only one application may read data from or write data to the database 22 running at the node 10. It should be understood, that the present invention is not limited to the scheduling methodology described above. Instead, any scheduling or data locking methodology which allows only one application at a time to read data from or write data to the database 22 may be used.

The OM software 16 monitors modifications made to the associated database 22 by the applications 18 running at the node 10 on which the OM software 16 is running, and broadcasts those updates to the other nodes 10. In response to these update broadcasts, the OM software 16 at each node 10 updates the database 22 at the node 10 such that data consistency is maintained.

Figure 2:
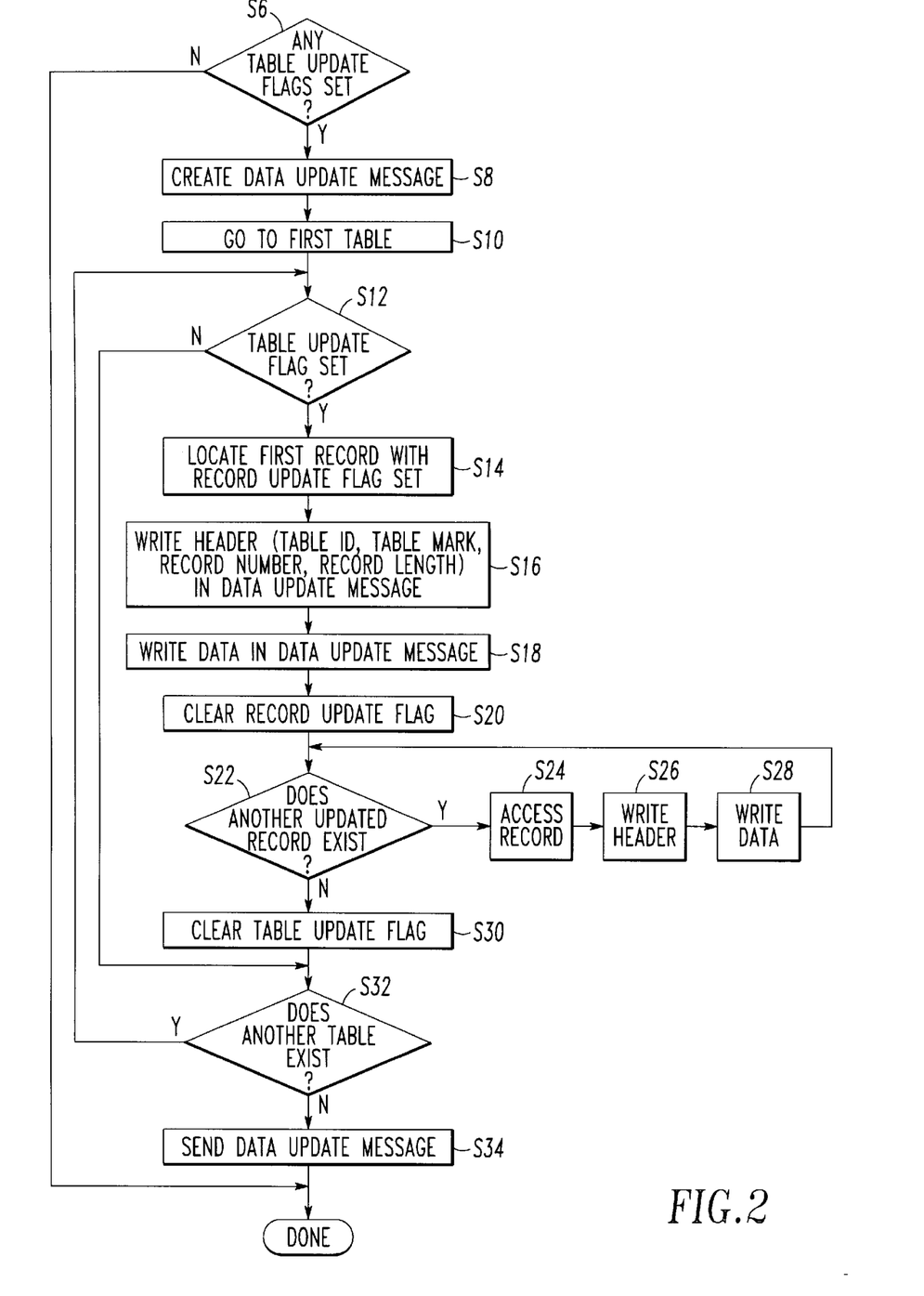
FIG. 2 illustrates one embodiment of the update distribution process by which the present invention broadcasts changes made to a database stored at one node of the system.

The update procedures performed by the OM software 16 will be described with respect to FIGS. 2–4. FIG. 2 illustrates one embodiment of the update distribution process by which the OM software 16 broadcasts changes made to the database 22 stored at the node 10 on which the OM software 16 is running.

During elaboration of the database 22, the OM software 16 creates an update flag associated with each table in the database 22, and associated with each record in each table. When, in response to an instruction from an application 18, the OM software 16 modifies a record, the OM software 16 sets the update flag associated with that modified record, and sets the update flag associated with the table containing that modified record. When an application 18 calls the OM software 16 to initiate a data transfer to the other nodes 10, the OM software 16 begins the update distribution process shown in FIG. 2.

The update distribution process of FIG. 2 begins with step S6, wherein the OM software 16 scans the table update flags to determine whether any of the table update flags are set. If none of the table update flags are set, the update distribution process ends. But, if a table update flag is set, processing proceeds to step S8 where the OM software 16 creates a data update message.

Then, in step S10 of FIG. 2, the OM software 16 goes to the first table in the database 22. In step S12, the OM software 16 determines if the table update flag is set. If the table update flag is not set, then processing proceeds to step S32 discussed in detail below. If the table update flag is set, then in step S14, the OM software 16 locates the first record in the table having its update flag set. Once this record is located, in step S16 the OM software 16 writes a header in the data update message. The header includes the table identifier of the table containing the modified record, a new table mark, the record number of the modified record, and the length in bytes of the modified record. The new table mark is an indicator added to the header which indicates that the record subsequent to the header is the start of the updates for a new table. Then, in step S18, the contents (i.e., data bytes) of the modified record are written into the data update message. Preferably, the contents of the record are written in their machine level representation as opposed to a format containing the field names, data types, data sizes, etc. that the applications 18 use to access records.

Next, in step S20, the OM software 16 clears the record update flag associated with this record, and in step S22 determines whether another record in this table has its update flag set. If another record is located, then in step S24, the OM software accesses the record. Subsequently, in step S26, the OM software writes a header corresponding to this record in the data update message. The header includes the table identifier of the table containing the modified record, a continuing table mark, the record number of the modified record, and the length of the modified record. The continuing table mark indicates that the record subsequent to the table mark is a continuation of the updates for the current table. Next, in step S28, the OM software 16 writes the contents of this modified record into the data update message in the same manner discussed above with respect to step S18, and processing proceeds to step S20.

In step 20, the OM software 16 clears the record update flag associated with this record, and in step S22 determines whether another record in this table has its update flag set.

If, in step S22, the OM software 16 does not locate another modified record in the table, processing proceeds to step S30. In step S30, the OM software 16 clears the table update flag. Then, in step S32, the OM software 16 determines whether another table exists in the database 22. If another table exists, then processing proceeds to step S12; otherwise, the data update message is transmitted over the network medium 14 by the RMF software 12 in step S34 and the update distribution processing ends.

In the above described manner, the OM software 16 broadcasts only updates made to the database 22 at the node 10 on which the OM software 16 is running. Because the databases 22 running at the other nodes 10 will be updated in accordance with the transmitted data update message, consistency is maintained between the databases 22.

Figure 3:
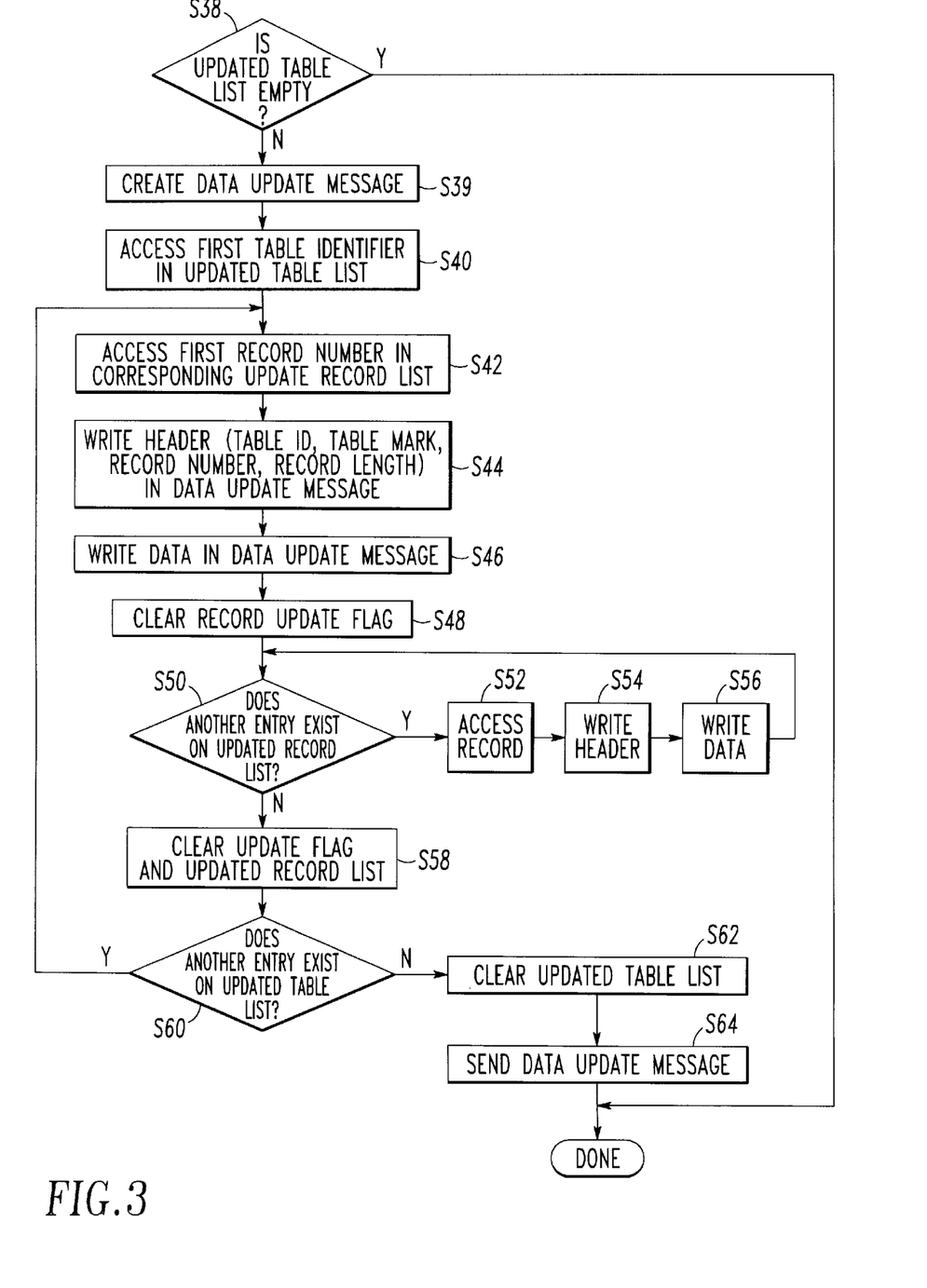
FIG. 3 illustrates another embodiment of the update distribution process according to the present invention.

FIG. 3 illustrates another embodiment of the update distribution process. When the database 22 is created according to this embodiment, the OM software 16 also creates an updated table list associated with the database 22 and an updated record list associated with each table. When the OM software 16, in response to an instruction from the applications 18, modifies a record, the OM software 16 places the table identifier for the table containing the modified record on the updated table list. Then the OM software 16 places the record number of the modified record on the updated record list for that table.

When an application 18 calls the OM software 16 to initiate a data transfer to the other nodes 10, the OM software 16 begins the update distribution process shown in FIG. 3. In step S38, the OM software determines if the updated table list is empty. If empty, the update distribution process ends. If not empty, then in step S39 the OM software 16 creates a data update message. Processing then proceeds to step S40, where the OM software 16 accesses the first table identifier in the updated table list. In step S42, the OM software 16 accesses the first record number in the updated record list corresponding to the table identified by the table identifier accessed in step S40.

Then, in step S44 the OM software 16 writes a header in the data update message. The header includes the table identifier of the table containing the modified record, a new table mark, the record number of the modified record, and the length of the modified record. Next, in step S46, the contents of the modified record are written into the data update message in the same manner discussed above with respect to step S18.

In step S48, the OM software 16 clears the record update flag for this record, and in step S50 the OM software 16 determines if another record number is on the updated record list. If another record number exists on the updated record list, then in step S52, the OM software 16 accesses the record, and in step S54 writes a header corresponding to the accessed record in the data update message. The header includes the table identifier, a continuing table mark, the record number, and the record length. Then in step S46 the contents of the record are written into the data update message in the same manner discussed above with respect to step S18. Processing then proceeds to step S48.

In step S48, the OM software 16 clears the record update flag for this record, and in step S50 the OM software 16 determines if another record is on the updated record list.

If, in step S50, another record number does not exist on the updated record list, processing proceeds to step S58. In step S58, the OM software 16 clears the table update flag and the updated record list associated with the table. Then, in step S60, the OM software 16 determines whether another table identifier exists on the updated table list. If another table identifier entry does exist, then processing proceeds to step S42; otherwise, in step S62 the updated table list is cleared. Next, the data update message is transmitted over the network medium 14 by the RMF software 12 in step S64 and the update distribution process ends.

In the above described manner, the OM software 16 broadcasts only updates made to the database 22 at the node 10 on which the OM software 16 is running. Unlike the embodiment of FIG. 2, the embodiment of FIG. 3 eliminates the time consuming process of searching through the database 22 to determine which tables and records have been modified. Accordingly, the embodiment of FIG. 3 more efficiently produces the data update messages, and because the databases 22 running at the other nodes 10 will be updated in accordance with the transmitted data update messages, consistency is maintained between the databases 22.

Figure 4:
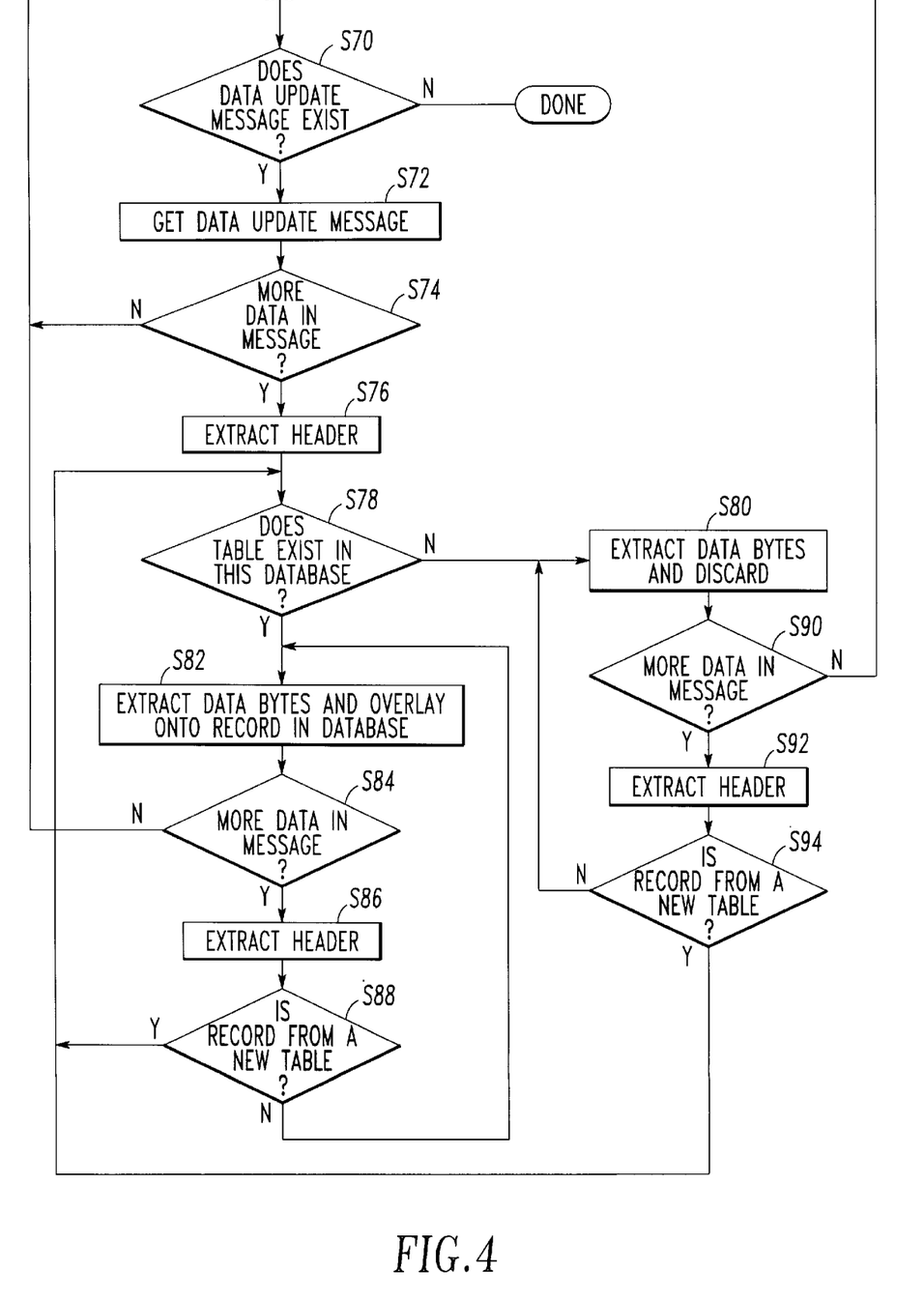
FIG. 4 illustrates one embodiment of the accept updates process by which the present invention updates the database stored at a node in response to data update messages generated by the update distribution process.

FIG. 4 illustrates one embodiment of the accept updates process by which the OM software 16 updates the database 22 stored at the node 10 on which the OM software is running in response to received data update messages. In step S70, the OM software 16 determines whether any data update messages have been received by the RMF software 12 by checking whether the queue storing such messages includes a data update message. If no data update messages are available, then the accept updates process ends. If a data update message can be dequeued, then the data update message is dequeued in step S72.

Next, in step S74 the OM software 16 determines if more data exists in the data update message. If no more data exists, then processing proceeds to step S70; otherwise, processing proceeds to step S76. In step S76, the OM software 16 extracts the next header from the data update message.

Then, in step S78, the OM software 16 determines if the table identified by the table identifier in the extracted header exists in the database 22 at this node 10. The OM software 16 makes this determination by comparing the table identifier from the extracted header to the table identifiers of the tables in the database 22. If no match is found, then the OM software 16 determines that the table corresponding to the table identifier in the extracted header does not exist in the database 22 at this node 10. Accordingly, in step S80, the OM software 16 discards the contents of the record in the data update message associated with the extracted header. This discarding process is performed using the record length of the record specified in the extracted header.

Next, in step S90, the OM software 16 determines if more data exists in the data update message. If no more data exists, then processing proceeds to step S70; otherwise, processing proceeds to step S92. In step S92, the OM software 16 extracts the next header from the data update message. Then, in step S94, the OM software 16 determines if the record associated with the extracted header is from the same table as the record associated with the previously extracted header. This determination is made by determining whether the table mark in the extracted header is a new table mark or a continuing table mark. If the table mark is a new table mark, the OM software 16 determines that the record associated with the header is from a new table, and processing proceeds to step S78. If the table mark is a continuing table mark, the OM software 16 determines that the record associated with the extracted header is from the same table, and processing proceeds to step S80.

If, in step S78, a match is found between the table identifier in the extracted header and a table identifier for a table in the database 22 at this node 10, the OM software 16 determines that the table identified by the table identifier in the extracted header is present in the database 22 at this node 10. Accordingly, processing proceeds to step S82.

Based on the table identifier and the record number in the extracted header, in step S82, the OM software 16 finds the indicated record in the database 22. The OM software 16 then copies the contents of the record in the data update message into the corresponding record of the database 22 in accordance with the record length specified in the extracted header. In performing step S82, the OM software 16 converts the machine level representation of the record back into the format expected by the applications 18 when accessing the record. Processing then proceeds to step S84.

In step S84 the OM software 16 determines if more data exists in the data update message. If no more data exists, then processing proceeds to step S70; otherwise, processing proceeds to step S86. In step S86, the OM software 16 extracts the next header from the data update message. Then, in step S88, the OM software 16 determines if the record associated with the extracted header is from the same table as the record associated with the previously extracted header. This determination is made by determining whether the table mark in the extracted header is a new table mark or a continuing table mark. If the table mark is a new table mark, the OM software 16 determines that the record associated with the header is from a new table, and processing proceeds to step S78. If the table mark is a continuing table mark, the OM software 16 determines that the record associated with the extracted header is from the same table, and processing proceeds to step S82.

According to the accept updates processing described above, the OM software 22 updates the database 22 running at the node 10 on which the OM software is running in accordance with the data update messages such that consistency between the databases 22 is maintained.

Because the database 22 is stored at each node 10, real-time operations with respect to the database 22 can take place because multiple network accesses of a single database have been eliminated. Furthermore, because a copy of the database 22 is kept at each node 10, there is no need for a dedicated master or backup of the database. Also, since applications 18 running at each node 10 do not have to access the database 22 running at another node, network locking mechanisms are not needed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of forming a distributed database, comprising:
   (a) providing a plurality of nodes connected via a communication medium;
   (b) providing at least one application on each node;
   (c) creating a database on each node, each database at least partially overlapping at least one other database, each database including a plurality of tables, and each table including at least one record, said step (c) including the substep of (c1) assigning ownership of each table in each database to only one application;
   (d) allowing only an owning application to modify a table owned by said owning application;
   (e) allowing only one application to read from and write to a database at a time;
   (f) distributing updates made to each database to every other database; and
   (g) updating each database in accordance with said distributed updates.

2. The method of claim 1, wherein said step (c) creates said database on each node such that said tables in each database are created in at least one of a static or dynamic manner.

3. The method of claim 1, wherein said step (d) comprises:
   (d1) sending modification requests from non-owning applications to said owning application, said modification requests indicating a desired modification to a record in a table not owned by said non-owning applications;
   (d2) receiving, by said owning application, said modification requests which request modification of a record in a table owned by said owning application;
   (d3) generating, by said owning application, modifications to tables owned by said owning application;
   (d4) generating, by said owning application, modifications to tables owned by said owning application based on received modification requests; and
   (d5) modifying tables owned by said owning application in accordance modifications generated in said steps (d3) and (d4).

4. The method of claim 1, wherein said step (f) broadcasts said updates made to each database on said communication medium using a reliable computer broadcast system.

5. A method for generating a data update message corresponding to a database stored at a node in a distributed database system, which includes a plurality of nodes each storing a database, to distribute updates to each database, each database overlapping at least partially with a database stored on one other node, each database containing a plurality of tables, each table having a table update flag associated therewith and containing at least one record, each record having a record update flag associated therewith, said table update flag and said record update flag indicating that a corresponding table and record, respectively, have been modified when set, the method comprising:
   (a) locating a modified table in said database based on said table update flags;
   (b) locating a modified record in said modified table based on said record update flags;
   (c) writing a header in said data update message, said header including a table identifier and record number, said table identifier identifying said modified table, said record number identifying said modified record in said modified table;
   (d) writing contents of said modified record in said data update message; and
   (e) sending said data update message to each node via a communication medium connecting said nodes.

6. The method of claim 5, further comprising the following steps prior to step (e):
   (f) determining whether another modified record exists in said modified table based on said record update flags; and
   (g) repeating said steps (c) and (d) for said another modified record if said step (f) determines that another modified record exists in said modified table.

7. The method of claim 6, further comprising the following steps prior to said step (e);
   (h) determining whether another modified table exists in said database based on said table update flags if said step (f) determines that another modified record does exist in said modified table;
   (i) repeating said steps (b)–(g) for said another modified table if said step (h) determines that another modified table exists in said database.

8. The method of claim 6, wherein said step (c) writes a table mark as part of said header, said table mark indicates whether said modified record corresponding to said header is from a different table than a record identified by said record number in the previous header written in said data update message.

9. The method of claim 6, further comprising:
   (h) clearing said table update flag corresponding to said modified table if said step (f) determines that another modified record does not exist in said modified table.

10. The method of claim 5, further comprising:
    (f) clearing said record update flag corresponding to said modified record after said step (d).

11. The method of claim 5, wherein said tables are at least one of statically and dynamically defined.

12. The method of claim 5, wherein said step (e) is preformed using a reliable network broadcast method.

13. A method for generating a data update message corresponding to a database stored at a node in a distributed database system, which includes a plurality of nodes each storing a database, to distribute updates to each database, each database overlapping at least partially with a database stored on one other node, each database containing a plurality of tables, each table having a table identifier associated therewith and containing at least one record, each record having a record number associated therewith, said database at each node having an updated table list associated therewith, said updated table list storing said table identifier for each modified table in said database, each table having an updated record list associated therewith, said updated record list storing said record number for each modified record in an associated table, the method comprising:

(a) locating a modified table in said database based on said updated table list;

(b) locating a modified record in said modified table based on said updated record list associated with said modified table;

(c) writing a header in said data update message, said header including said table identifier for said modified table and said record number for said modified record;

(d) writing contents of said modified record in said data update message; and (e) sending said data update message to each node via a communication medium connecting said nodes.

14. The method of claim 13, further comprising the following steps prior to step (e):

(f) determining whether another modified record exists in said modified table based on said updated record list corresponding to said modified table; and (g) repeating said steps (c) and (d) for said another modified record if said step (f) determines that another modified record exists in said modified table.

15. The method of claim 14, further comprising the following steps prior to said step (e):

(h) determining whether another modified table exists in said database based on said updated table list if said step (f) determines that another modified record does not exist in said modified table;

(i) repeating said steps (b)–(g) for said another modified table if said step (h) determines that another modified table exists.

16. The method of claim 14, wherein said step (c) writes a table mark as part of said header, said table mark indicates whether said modified record corresponding to said header is from a different table than a record identified by said record number in the previous header written in said data update message.

17. The method of claim 14, further comprising:

(h) clearing said updated record list associated with said modified table if said step (f) determines that another modified record does not exist in said modified table.

18. The method of claim 13, wherein said tables are at least one of statically and dynamically defined.

19. The method of claim 13, wherein said step (e) is performed using a reliable network broadcast method.

20. A method of updating a database stored at a node in a distributed database system, which includes a plurality of nodes each storing a database and connected via a communication medium, each database overlapping at least partially with a database stored on one other node, each database containing a plurality of tables, each table containing at least one record, the method comprising:

(a) receiving, at a node, a data update message on said communication medium, said data update message including at least one header associated with a record and contents of said record, said header including a table identifier identifying a table containing said record and a record number associated with said record;

(b) extracting said header from said data update message;

(c) locating said record in said database stored at said node based on said table identifier and said record number in said extracted header; and (d) writing said contents of said record in said data update message into said record of said database located in step (c).

21. The method of claim 20, further comprising the following steps prior to step (c):

(e) determining whether said table containing said record exists in said database based on said table identifier;

(f) discarding said contents of said record if said step (e) determines that said table containing said record does not exist in said database; and wherein said step (c) locates said record if said step (e) determines that said table containing said record does exist in said database.

22. The method of claim 21, further comprising the following steps:

(g) determining whether more data exists in said data update message;

(h) extracting another header from said data update message if said step (g) determines that more data exists in said data update message, each header further including a table mark indicating whether said record associated with said header is from a different table than a record associated with the previous header in said data update message;

(i) determining whether said record associated with said another header is from a different table than a record associated with said previous header based on said table mark;

(j) repeating steps (c) and (d) if (1) said step (i) determines that said record associated with said another header is not from a different table than a record associated with said previous header and (2) said step (e) determined that said table containing said record associated with said previous header exists in said database;

(k) repeating step (f) if (1) said step (i) determines that said record associated with said another header is not from a different table than a record associated with said previous header and (2) said step (e) determined that said table containing said record associated with said previous header does not exists in said database; and (l) returning to step (e) if said step (i) determines that said record associated with said another header is from a different table than a record associated with said previous header.

23. A distributed database system, comprising:

a plurality of nodes connected via a communication medium; and wherein each node includes, at least one application;

a database stored on said node, said database at least partially overlapping at least one other database, said database including a plurality of tables, and each table including at least one record, ownership of each table in said database being assigned to only one application, and only an owning application being able to modify a table owned by said owning application;

scheduling means for scheduling running of said applications on said node such that only one application reads from and writes to said database at a time;

distributing means for distributing updates made to said database to every other database; and updating means for updating said database in accordance with received distributed updates.

24. The system of claim 23, wherein each node further comprises:

means for creating said tables in said database in at least one of a static or dynamic manner.

25. The system of claim 23, wherein non-owning applications send modification requests to said owning application, said modification requests indicating a desired modification to a record in a table not owned by said non-owning applications;

said owning application receives said modification requests which request modification of a record in a table owned by said owning application, first generates modifications to tables owned by said owning application, second generates modifications to tables owned by said owning application based on received modification requests, and modifies tables owned by said owning application in accordance with said first and second generated modifications.

26. The system of claim 23, wherein said distributing means broadcasts said updates made to said database on said communication medium using a reliable computer broadcast system.

27. A distributed database system, comprising:

a plurality of nodes connected via a communication medium, each node storing a database, each database overlapping at least partially with a database stored on one other node, each database containing a plurality of tables, each table having a table update flag associated therewith and containing at least one record, each record having a record update flag associated therewith, said table update flag and said record update flag indicating that a corresponding table and record, respectively, have been modified when set; and wherein each node locates a modified table in said database based on said table update flags, locates a modified record in said modified table based on said record update flags, first writes a header in a data update message, said header including a table identifier and record number, said table identifier identifying said modified table, said record number identifying said modified record in said modified table, second writes contents of said modified record in said data update message, and sends said data update message to each node via said communication medium.

28. The system of claim 27, wherein each node, prior to sending said data update message, first determines whether another modified record exists in said modified table based on said record update flags, and first repeats said first and second writing for said another modified record if said node determines that another modified record exists in said modified table.

29. The system of claim 28, wherein each node, prior to sending said data update means, second determines whether another modified table exists in said database based on said update flags table if said node determines that another modified record does exist in said modified table, and second repeats said second locating, said first writing, said second writing, said first determining and said second repeating for said another modified table if said node determines that another modified table exists in said database.

30. The system of claim 28, wherein each node, in performing said first writing, writes a table mark as part of said header, said table mark indicates whether said modified record corresponding to said header is from a different table than a record identified by said record number in the previous header written in said data update message.

31. The system of claim 28, wherein each node clears said table update flag corresponding to said modified table if said node determines that another modified record does not exist in said modified table.

32. The system of claim 27, wherein each node clears said record update flag corresponding to said modified record after said second writing.

33. The system of claim 27, wherein said tables are at least one of statically and dynamically defined.

34. The system of claim 27, wherein each node uses a reliable network broadcast system to send said data update messages.

35. A distributed database system, comprising:

a plurality of nodes connected via a communication medium, each node storing a database, each database overlapping at least partially with a database stored on one other node, each database containing a plurality of tables, each table having a table identifier associated therewith and containing at least one record, each record having a record number associated therewith, said database at each node having an updated table list associated therewith, said updated table list storing said table identifier for each modified table in said database, each table having an updated record list associated therewith, said updated record list storing said record number for each modified record in an associated table; and wherein each node first locates a modified table in said database based on said updated table list, second locates a modified record in said modified table based on said updated record list associated with said modified table, first writes a header in a data update message, said header including said table identifier for said modified table and said record number for said modified record, second writes contents of said modified record in said data update message, and sends said data update message to each node via said communication medium.

36. The system of claim 35, wherein each node, prior to sending said data update message, first determines whether another modified record exists in said modified table based on said updated record list corresponding to said modified table, and first repeats said first and second writing for said another modified record if said node determines that another modified record exists in said modified table.

37. The system of claim 36, wherein each node, prior to sending said data update message, second determines whether another modified table exists in said database based on said updated table list if said node determines that another modified record does not exist in said modified table, and second repeats said second locating, said first writing, said second writing, said first determining and said second repeating for said another modified table if said node determines that another modified table exists.

38. The system of claim 36, wherein each node, in performing said second writing, writes a table mark as part of said header, said table mark indicates whether said modified record corresponding to said header is from a different table than a record identified by said record number in the previous header written in said data update message.

39. The system of claim 36, wherein each node clears said updated record list associated with said modified table if said node determines that another modified record does not exist in said modified table.

40. The system of claim 35, wherein said tables are at least one of statically and dynamically defined.

41. The system of claim 35, wherein each node uses a reliable network broadcast system to send said data update message.

42. A distributed database system, comprising:

a plurality of nodes each storing a database and connected via a communication medium, each database overlapping at least partially with a database stored on one other node, each database containing a plurality of tables, each table containing at least one record;

at least one node receiving a data update message on said communication medium, said data update message including at least one header associated with a record and contents of said record, said header including a table identifier identifying a table containing said record and a record number associated with said record;

said node extracting said header from said data update message, locating said record in said database stored at said node based on said table identifier and said record number in said extracted header, and writing said contents of said record in said data update message into said located record of said database.

43. The system of claim 42, wherein said node, prior to writing said contents of said record, first determines whether said table containing said record exists in said database based on said table identifier, and discards said contents of said record if said node determines that said table containing said record does not exist in said database; and wherein said node performs said locating and said writing if said node determines that said table containing said record does exist in said database.

44. The system of claim 43, wherein said node second determines whether more data exists in said data update message, extracts another header from said data update message if said node determines that more data exists in said data update message, each header further including a table mark indicating whether said record associated with said header is from a different table than a record associated with the previous header in said data update message;

said node third determines whether said record associated with said another header is from a different table than a record associated with said previous header based on said table mark;

said node repeats said locating and said writing if (1) said node determines that said record associated with said another header is not from a different table than a record associated with said previous header and (2) said node determined that said table containing said record associated with said previous header exists in said database;

said node repeats said discarding if (1) said node determines that said record associated with said another header is not from a different table than a record associated with said previous header and (2) said node determined that said table containing said record associated with said previous header does not exist in said database; and said node returns to said first determining if said node determines that said record associated with said another header is from a different table than a record associated with said previous header.

45. A method of communication between applications in a distributed database system which includes a plurality of nodes connected via a network medium, each node running at least one application and storing a database, each database at least partially overlapping at least one other database, each database including a plurality of tables, and each table including at least one record and being owned by only one application, the method comprising:

(a) sending modification requests from non-owning applications to an owning application via said communication medium, said modification requests indicating a desired modification to a record in a table not owned by said non-owning application and owned by said owning application;

(b) receiving, by said owning application, modification requests which request modification of a record in a table owned by said owning application; and (c) modifying tables owned by said owning application in accordance with modifications generated by said owning application and modifications in said received modification requests.

* * * * *